(12) United States Patent
Jiang et al.

(10) Patent No.: US 10,692,264 B2
(45) Date of Patent: Jun. 23, 2020

(54) HAZARD POINT MARKING METHOD AND SYSTEM

(71) Applicant: BEIJING FOREVER TECHNOLOGY CO., LTD., Beijing (CN)

(72) Inventors: Chunhua Jiang, Beijing (CN); Xianlong Chen, Beijing (CN); Xinwei Luo, Beijing (CN); Xiaolong Chen, Beijing (CN); Jin Wang, Beijing (CN); Enjie He, Beijing (CN)

(73) Assignee: BEIJING FOREVER TECHNOLOGY CO., LTD., Beijing (CN)

( * ) Notice: Subject to any disclaimer, the term of this patent is extended or adjusted under 35 U.S.C. 154(b) by 64 days.

(21) Appl. No.: 16/033,329

(22) Filed: Jul. 12, 2018

(65) Prior Publication Data
US 2019/0156539 A1    May 23, 2019

(30) Foreign Application Priority Data
Nov. 21, 2017   (CN) .......................... 2017 1 1167637

(51) Int. Cl.
| | | |
|---|---|---|
| *G06T 11/60* | (2006.01) | |
| *G02B 27/01* | (2006.01) | |
| *E21F 17/00* | (2006.01) | |
| *E21F 17/18* | (2006.01) | |
| *G06F 3/0481* | (2013.01) | |
| *G06Q 50/06* | (2012.01) | |
| *H02G 1/00* | (2006.01) | |
| *G06F 3/13* | (2006.01) | |
| *G06F 3/01* | (2006.01) | |

(52) U.S. Cl.
CPC .............. *G06T 11/60* (2013.01); *E21F 17/00* (2013.01); *E21F 17/18* (2013.01); *G02B 27/017* (2013.01); *G02B 27/0172* (2013.01); *G02B 27/01* (2013.01); *G02B 2027/014* (2013.01); *G02B 2027/0138* (2013.01); *G02B 2027/0141* (2013.01); *G06F 3/012* (2013.01); *G06F 3/04812* (2013.01); *G06F 3/04815* (2013.01); *G06F 3/13* (2013.01); *G06Q 50/06* (2013.01); *H02G 1/00* (2013.01)

(58) Field of Classification Search
None
See application file for complete search history.

(56) References Cited

U.S. PATENT DOCUMENTS

| | | | | |
|---|---|---|---|---|
| 9,535,158 | B1 * | 1/2017 | Breiholz | .............. G01S 13/953 |
| 2014/0063054 | A1 * | 3/2014 | Osterhout | ............... G06F 3/005 |
| | | | | 345/633 |

(Continued)

*Primary Examiner* — YuJang Tswei
(74) *Attorney, Agent, or Firm* — Harness, Dickey & Pierce, P.L.C.

(57) ABSTRACT

A hazard point marking method and a hazard point marking system are provided. The method includes: acquiring, by Augmented Reality (AR) glasses, position information of a hazard point in response to a triggering operation of an inspector, where the position information of the hazard point is used for characterizing a position of the hazard point in a tunnel model; sending, by the AR glasses, the position information of the hazard point to a server; and marking, by the server, the hazard point in the tunnel model based on the position information of the hazard point.

16 Claims, 3 Drawing Sheets

Augmented Reality (AR) glasses acquire position information of a hazard point in response to a triggering operation of an inspector. The position information of the hazard point is used for characterizing a position of the hazard point in a tunnel model — S201

The AR glasses sends the position information of the hazard point to a server — S202

The server marks the hazard point in the tunnel model based on the position information of the hazard point — S203

(56) References Cited

U.S. PATENT DOCUMENTS

| | | | |
|---|---|---|---|
| 2016/0082840 A1* | 3/2016 | Yoshida | B60K 35/00 701/36 |
| 2017/0010113 A1* | 1/2017 | van der Laan | G01C 21/32 |
| 2018/0322783 A1* | 11/2018 | Toyoda | G06T 19/006 |

* cited by examiner

HAZARD POINT MARKING METHOD AND SYSTEM

The present application claims priority to Chinese Patent Application No. 201711167637.X, titled "HAZARD POINT MARKING METHOD AND SYSTEM", filed on Nov. 21, 2017 with the State Intellectual Property Office of People's Republic or China, which is incorporated herein by reference in its entirety.

FIELD

The present disclosure relates to the technical field of Augmented Reality; and particularly to a hazard point marking method, and a hazard point marking system.

BACKGROUND

With rapid development of a power supply network of an electric power system, distribution of transmission cable in an underground power supply network is becoming more and more intensive. In order to guarantee a safe operation of the transmission cable and avoid an accident caused by a transmission cable fault, a management department of the transmission cable may dispatch an inspector to regularly perform a safety inspection on the transmission cable in a cable tunnel.

During an inspection process performed by the inspector in the tunnel, if it is found that a hazard point exists in the cable in the tunnel, information of the hazard point is recorded. The information of the hazard point includes position information and state description information. After the inspection process, the inspector inputs the information of the hazard point into an information management system for an operator, such as a maintainer, to view. The above hazard point recording method is time-consuming, inefficient and may cause a large error.

SUMMARY

A hazard point marking method is provided according to the disclosure, to decrease time consumed in a process of recording a hazard point and increase the efficiency and the accuracy of recording the hazard point.

In a first aspect, a hazard point marking method is provided in the present disclosure, which includes: acquiring, by Augmented Reality (AR) glasses, position information of a hazard point in response to a triggering operation of an inspector, where the position information of the hazard point is used for characterizing a position of the hazard point in a tunnel model; sending, by the AR glasses, the position information of the hazard point to a server; and marking, by the server, the hazard point in the tunnel model based on the position information of the hazard point.

In an embodiment, the hazard point marking method further includes: acquiring, by the AR glasses, a photo of the hazard point; sending, by the AR glasses, the photo of the hazard point to the server; and establishing, by the server, a linking relation between the photo of the hazard point and the marked hazard point.

In an embodiment, the hazard point, marking method further includes: acquiring, by the AR glasses, a type of the hazard point; sending, by the AR glasses, the type of the hazard point to the server; and establishing, by the server, a linking relation between the type of the hazard point and the marked hazard point.

In an embodiment, the hazard point marking method further includes: displaying, by the server, the position information, the photo and the type of the hazard point in response to a triggering operation of an operator on the hazard point.

In an embodiment, the server marking the hazard point in the tunnel model based on the position information of the hazard point includes: determining, by the server, a marking position of the hazard point in the tunnel model based on the position information of the hazard point; and generating and displaying, by the server, a virtual mark for the hazard point at the marking position.

In a second aspect, a hazard point marking system is provided according to the disclosure. The system includes: Augmented Reality (AR) glasses and a server. The AR glasses is configured to acquire position information of a hazard point and send the position information of the hazard point to the server in response to a triggering operation of an inspector. The position information of the hazard point is used for characterizing a position of the hazard point in a tunnel model. The server is configured to mark the hazard point in the tunnel model based on the position information of the hazard point.

In an embodiment, the AR glasses is further configured to acquire a photo of the hazard point and send the photo of the hazard point to the server; and the server is further configured to establish a linking relation between the photo of the hazard point and the marked hazard point.

In an embodiment, the AR glasses is further configured to acquire a type of the hazard point and send the type of the hazard point to the server; and the server is further configured to establish a linking relation between the type of the hazard point and the marked hazard point.

In an embodiment, the server is further configured to display the position information, the photo and the type of the hazard point in response to a triggering operation of an operator on the hazard point.

In an embodiment, the server is configured to: determine a marking position of the hazard point in the tunnel model based, on the position information of the hazard point; and generate and display a virtual mark for the hazard point at the marking position.

It may be known from the above technical solutions that, AR glasses acquire position information of a hazard point characterizing a position of the hazard point in a tunnel model in response to a triggering operation of an inspector and send the position information of the hazard point to a server after acquiring the position information of the hazard point. The server marks the hazard point in the tunnel model after receiving the position information of the hazard point. It may be know from the above process, when the inspector inspects a cable in an underground tunnel, the AR glasses worn by the inspector acquire the position of the hazard point in the tunnel and send the position of the hazard point to the server, so that the server may mark the hazard point in the tunnel model. In this case, the inspector can directly and accurately record the position information of the hazard point into the server through the AR glasses. It is not required to firstly record information of approximate positions of all the hazard points on a working list and then send the position information of the hazard points to the server, thereby decreasing time consumed in a process of recording a hazard point and increase the efficiency and the accuracy of recording the hazard point.

BRIEF DESCRIPTION OF THE DRAWINGS

In order to more clearly illustrate technical solutions of the embodiments of the present disclosure or the conventional technology, the drawings required in the description of the embodiments or the conventional technology are briefly described below. Apparently, the drawings show only some embodiments of the present disclosure, and other drawings may be acquired by those skilled in the art based on the drawings provided herein without any creative work.

DETAILED DESCRIPTION

Figure 1:
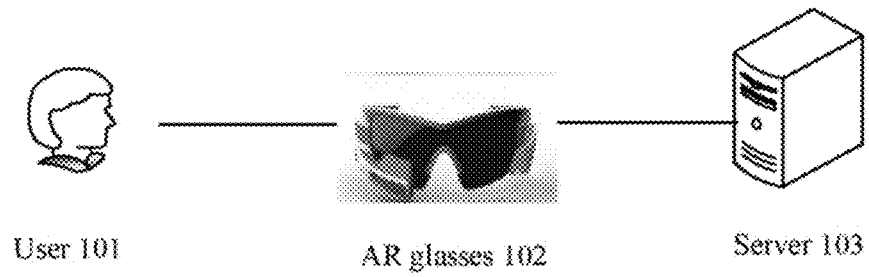
FIG. 1 is a schematic diagram of a scenario according to an embodiment of the present disclosure.

In order to provide a technical solution in which time consumed in a process of recording a hazard point may be decreased and the efficiency and the accuracy of recording the hazard point may be increased, a hazard point marking method and a hazard point marking system are provided according to the embodiments of the present disclosure. Preferred embodiments of the present disclosure are described hereinafter in conjunction with the drawings of the specification. It should be understood that the preferred embodiments described herein are only used for illustrating the present disclosure and are not intended to limit the present disclosure, in the absence of conflict, the embodiments of the present disclosure and characteristics of the embodiments may be combined.

The applicant found through the research that, in the conventional technology, in a case that an inspector finds a hazard point in a cable in a tunnel when performing an inspection process in the tunnel, the inspector records information of the hazard point on a working list carried with the inspector. The information of the hazard point includes position information and state description information or the like. After the inspection process, the inspector inputs the information of the hazard point recorded on the working list into an information management system, for an operator, such as a maintainer, to view. The maintainer maintains the cable at a position where the hazard point is located after acquiring the information of the hazard point. With such a hazard point recording method, the inspector can not upload the information of the hazard point to the information management system timely when finding the hazard point, and the inspector inputs the information of the hazard point into the information management system based on the working list after inspecting all the hazard points. It takes a long time from a step of finding the hazard point to a step of inputting the information of the hazard point into the information management system, resulting in a low recording efficiency. In addition, the information of the hazard point is firstly recorded on the working list, and then the information is inputted into the information management system based on the working list, the recorded information of the hazard point characterizes an approximate position and a state of the hazard point rather than an accurate position of the hazard point, in this case, the recorded information of the hazard point has a larger error and a less accuracy.

In order to solve the above technical problem, a hazard point marking method and a hazard point marking system are provided in the present disclosure, so that the inspector may send the position information of the hazard point to the server timely and accurately when finding the hazard point in the tunnel. Specifically, when the inspector finds a hazard point, the inspector performs a triggering operation on AR glasses, the AR glasses acquire position information of the hazard point characterizing a position of the hazard point in a tunnel model in response to the triggering operation of the inspector and send the acquired position information of the hazard point to a server. The server marks the hazard point in the tunnel model after receiving the position information of the hazard point. It may be known from the above process, when the inspector finds the hazard point of the cable in the tunnel, the inspector sends the position information of the hazard point to the server through operating the AR glasses, rather than sending the position information of the hazard points to the server after inspecting all the hazard points. In this case, time consumed from a step that the inspector finds the hazard point to a step that the inspector records the hazard point into the server decreases greatly, thereby improving the efficiency of recording the hazard point. In addition, the position information of the hazard point is recorded through the AR glasses, the recorded information can accurately reflect the position of the hazard point in the tunnel, and the hazard point is recorded more accurately.

It should be noted that an Augmented Reality technology is used in the AR glasses in the present disclosure. The Augmented Reality technology is a technology which may integrate acquired real world information with virtual world information "seamlessly". Specifically, in a case where a hazard point exists in the cable in the tunnel, the AR glasses acquire information of the cable where a safety hazard exists from the real world and generate a virtual mark characterizing a position of the cable where the safety hazard exists. Then the information of the cable in the real world may be "seamlessly" integrated with the virtual mark. In this case, the AR glasses send the position information of the hazard point to the server for adding information of the virtual mark on a basis of the information of the cable in the real world.

As an example, one of scenarios according to embodiments of the present disclosure may be the scenario shown in FIG. 1. In the scenario, a user 101 performs a triggering operation on AR glasses 102 after finding a hazard point of a cable in a tunnel. The AR glasses acquire position information of the hazard point in response to the triggering operation of the user 101 and send the position information of the hazard point to a server 103. The position information of the hazard point characterizes a position of the hazard point in a unmet model. The server 103 marks the hazard point in the tunnel model based on the received position information of the hazard point.

In order to better understand the technical solutions of the present disclosure, various non-restrictive embodiments of a hazard point marking method and a hazard point marking system according to the present disclosure are described in conjunction with drawings hereinafter.

Figure 2:
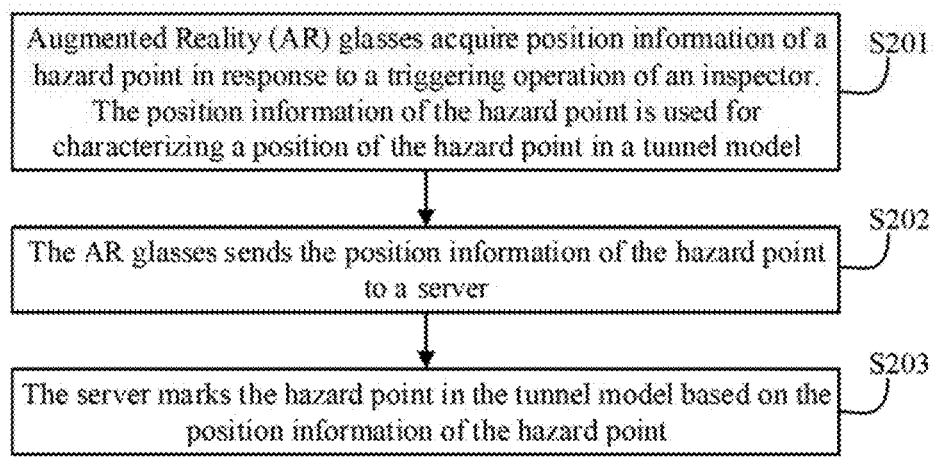
FIG. 2 is a schematic How diagram of a hazard point marking method according to an embodiment of the present disclosure.

Reference is made to FIG. 2, which shows a schematic flow diagram of a hazard point marking method according to an embodiment of the present disclosure. In the embodiment, the method includes following step S201 to S203.

In step S201, AR glasses acquire position information of a hazard point in response to a triggering operation of an inspector. The position information of the hazard point is used for characterizing a position of the hazard point in a tunnel model.

As an exemplary implementation, when the inspector performs an inspection process in a tunnel with wearing the AR glasses, the inspector uses the AR glasses to observe a current inspection screen. If the inspector finds out the hazard point existing in a cable in the tunnel, the hazard point may be added into the screen currently observed on the AR glasses, where the hazard point indicates that safety hazard exists in the cable in the picture currently observed on the AR glasses. The inspector performs the triggering operation on the hazard point in the screen displayed on the AR glasses, then the AR glasses acquire the position information of the hazard point based on the hazard point added in the currently observed screen in response to the triggering operation.

Figure 3:
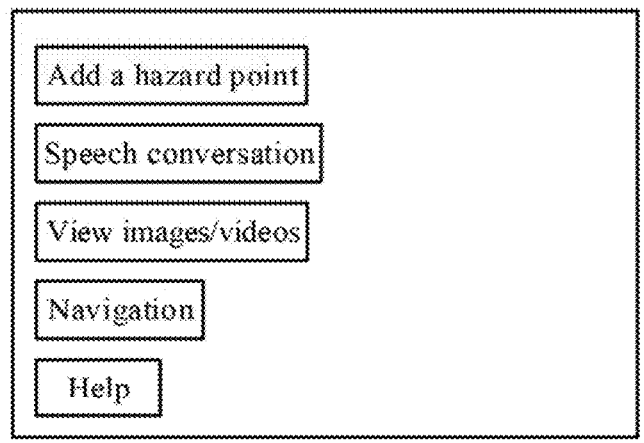
FIG. 3 is a schematic diagram of an AR glasses display interface according to an embodiment of the present disclosure.

In practice, the AR glasses may provide multiple application functions. As shown in FIG. 3, the AR glasses may provide multiple functions such as adding hazard points, speech conversation, view images/videos, navigation, help. In a case where the inspector finds out the hazard point existing in the tunnel, before performing the triggering operation on the AR glasses, the inspector may click the "Add a hazard point" icon on a display interface of the AR glasses, to activate a function of adding a hazard point of the AR glasses, thereby adding the hazard point in the screen currently observed on the AR glasses.

In step S202, the AR glasses send the position information of the hazard point to a server.

After acquiring the position information of the hazard point, the AR glasses may send the position information of the hazard point to the server, so that a maintainer may view the position of the cable that needs to be maintained in the tunnel.

In step S203, the server marks the hazard point in the tunnel model based on the position information of the hazard point.

The tunnel model is a model corresponding to the tunnel currently inspected by the inspector, which is a virtual representation form of a tunnel in the real world. The virtual tunnel model can reflect information of the tunnel in the real world.

The position information of the hazard point is used for characterizing a virtual position of the hazard point in the tunnel model. After the server receives the position information of the hazard point sent from the AR glasses, the hazard point is marked in the tunnel model corresponding to the tunnel currently inspected by the inspector based on the position information of the hazard point. In this way, when the inspector view the tunnel model, the inspector may find the position of the cable where the safety hazard exists in the tunnel in the real world and perform maintenance, based on the position of the hazard point marked on the tunnel model.

As an exemplary implementation, after receiving the position information of the hazard point, the server takes a position corresponding to the position information of the hazard point as a marking position. Then the marking position of the hazard point may be determined in the tunnel model, and a virtual mark for the hazard point is generated and displayed at the marking position.

It may be understood that, in order to highlight a display of the hazard point in the tunnel model, the virtual mark for the hazard point may be set to have a more visible color (such as red, yellow), and/or the virtual mark may be set to have a graph with a warning effect. It is easier to find the position of the hazard point in the tunnel model by setting the more visible color and/or the graph with the warning effect.

In addition, in order to represent the position of the hazard point in the tunnel model more accurately, a position identifier may be set for the virtual mark, so that the maintainer may find the accurate position of the hazard point in the tunnel model based on the identifier of the hazard point when viewing the hazard point in the tunnel model.

Figure 4:
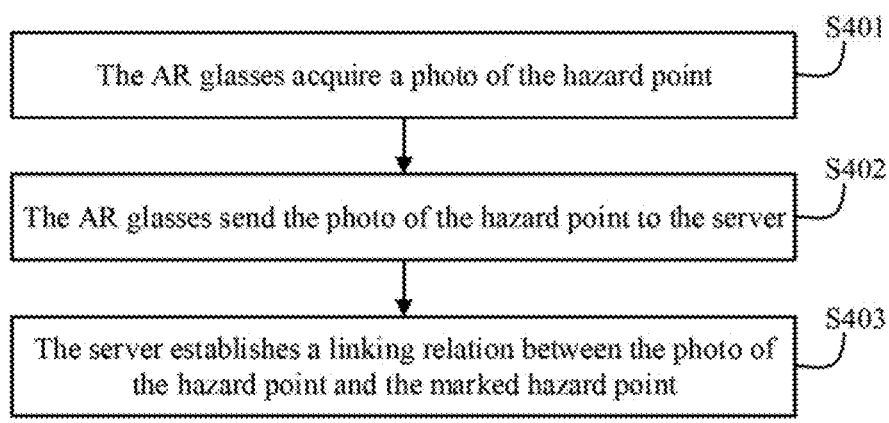
FIG. 4 is a schematic flow diagram of a method for displaying a photo of a hazard point to an operator according to an embodiment of the present disclosure.
Figure 5:
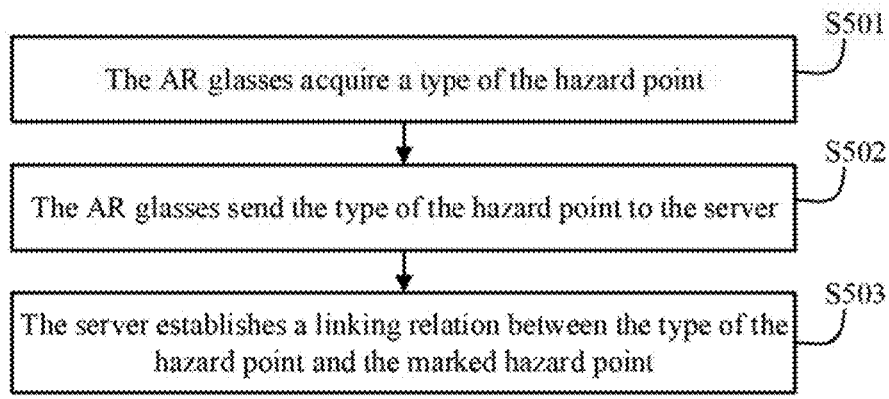
FIG. 5 is a schematic (low diagram of a method for displaying a type of a hazard point to an operator according to an embodiment of the present disclosure.

In practice, in order to make it is easier for an operator such as the maintainer, the inspector, to learn the position of the hazard point in the tunnel model from the server more intuitively, a photo of the hazard point may be displayed to the operator. As an example, reference is made to FIG. 4, the embodiment may further include step S401 to step S403.

In step S401, AR glasses acquire a photo of the hazard point.

There are a variety of specific implementations for the AR glasses to acquire the photo of the hazard point. Following non-restrictive implementations are provided to illustrate step S401.

As another example, the inspector triggers a capturing instruction on the AR glasses. After the AR glasses receive the capturing instruction, a screen observed on the AR glasses is captured to acquire the photo of the hazard point.

As another example, after the inspector determines the position of the hazard point, the AR glasses automatically capture the photo to acquire the photo of the hazard point, thereby achieving acquisition of the photo of the hazard point. The specific implementation flow is described as follows. After the inspector determines the position of the hazard point, the AR glasses automatically select one frame screen from the currently observed screens, and the frame screen is determined as the photo of the hazard point, thereby achieving the acquisition of the photo of the hazard point.

In step S402, the AR glasses send the photo of the hazard point to the server.

In step S403, the server establishes a linking relation between the photo of the hazard point and the marked hazard point.

The linking relation between the photo of the hazard point and the hazard point marked in the tunnel model is established by the server, when viewing the hazard point, the operator may see an actual condition of the hazard point more directly through the photo. In this case, the operator, in particularly to the maintainer, may determine a method for repairing the hazard point based on the actual condition.

Furthermore, there may be different types of safety hazards in cables with safety hazards in the tunnel, such as, the cable is damaged, the frame for fixing the cable is damaged. Correspondingly, the maintainer have to perform pointed maintenance based on a type of the safety hazard that appears on the cable. Therefore, in order to make the maintainer learn the type of the safety hazard that appears on the cable in advance, thereby performing the pointed maintenance, as an example, the embodiment may further include step S501 to step S503.

In step S501, AR glasses acquire a type of the hazard point.

The type of the hazard point may be represented by a text. For example, the text "damage" may be used for indicating that the type of the hazard point is that the cable is damaged. The type of the hazard point may be also be represented by the color of the hazard point. For example, the red may indicate that there is safety hazard in the cable itself, the yellow may indicate that the frame for fixing the cable is damaged.

There are a variety of specific implementations for the AR glasses to acquire the type of the hazard point. Following non-restrictive implementations are provided to illustrate step S501.

As an example, the AR glasses are configured with multiple different types of the hazard points in advance. After determining the position of the hazard point on the screen currently observed on the AR glasses, the inspector selects one type from the multiple types of hazard points provided on a display interface of the AR glasses as the type of the hazard point found by the inspector. The AR glasses acquires the type of the hazard point based on a selection operation of the inspector.

In step S502, the AR glasses send the type of the hazard point to the server.

In step S503, the server establishes a linking relation between the type of the hazard point and the marked hazard point.

The linking relation among the hazard point, the photo of the hazard point and the type of the hazard point are established, when viewing the hazard point, the operator may see the position of the hazard point more intuitively through the photo and acquire the type of the safety hazard that appears on the cable in advance based on the type of the hazard point. In this case, the operator may find the hazard point easily and perform the pointed maintenance on the hazard point.

In the embodiment, AR glasses acquire position information of a hazard point characterizing a position of the hazard point in a tunnel model in response to a triggering operation of an inspector and send the position information of the hazard point to a server after acquiring the position information of the hazard point. The server marks the hazard point in the tunnel model after receiving the position information of the hazard point. It may be know from the above process, when the inspector inspects a cable in an underground tunnel, the AR glasses worn by the inspector acquire the position of the hazard point in the tunnel and send the position of the hazard point to the server, so that the server may mark the hazard point in the tunnel model. In this case, the inspector can directly and accurately record the position information of the hazard point into the server through the AR glasses. It is not required to firstly record information of approximate positions of all the hazard points on a working list and then send the position information of the hazard points to the server, thereby decreasing time consumed in a process of recording a hazard point and increase the efficiency and the accuracy of recording the hazard point.

Figure 6:
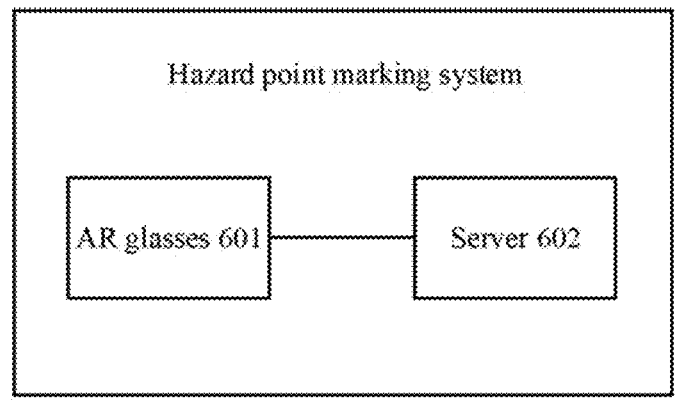
FIG. 6 is a schematic diagram of an architecture of a hazard point marking system according to an embodiment of the present disclosure.

In addition, a hazard point marking system is further provided according to the disclosure. Reference is made to FIG. 6 which is a schematic diagram of an architecture of a hazard point marking system according to an embodiment of the present disclosure. The system includes AR glasses 601 and a server 602. The AR glasses is configured to acquire position information of a hazard point and send the position information of the hazard point to the server in response to a triggering operation of an inspector. The position information of the hazard point is used for characterizing a position of the hazard point in a tunnel model. The server 602 is configured to mark the hazard point in the tunnel model based on the received position information of the hazard point.

In an embodiment, the AR glasses 601 is further configured to acquire a photo of the hazard point and send the photo of the hazard point to the server 602. The server 602 is further configured to establish a linking relation between the photo of the hazard point and the marked hazard point.

In an embodiment, the AR glasses 601 is further configured to acquire a type of the hazard point and send the type of the hazard point to the server 602. The server 602 is further configured to establish a linking relation between the type of the hazard point and the marked hazard point.

In an embodiment, the server 602 is further configured to display the position information, the photo and the type of the hazard point in response to a triggering operation of an operator on the hazard point.

In an embodiment, the server 602 is configured to: determine a marking position of the hazard point in the tunnel model based on the position information of the hazard point; and generate and display a virtual mark for the hazard point at the marking position.

The hazard point marking system shown in FIG. 6 is a system corresponding to the hazard point marking method shown in FIG. 2. The specific implementation of the system is similar to the specific implementation of the method shown in FIG. 2. Reference may be made to the description for the method shown in FIG. 2, which is not repeated herein.

It can be seen that, when the inspector inspects a cable in an underground tunnel, the AR glasses worn by the inspector acquire the position of the hazard point in the tunnel and send the position of the hazard point to the server, so that the server may mark the hazard point in the tunnel model. In this case, the inspector can directly and accurately record the position information of the hazard point into the server through the AR glasses. It is not requited to firstly record information of approximate positions of all the hazard points on a working list and then send the position information of the hazard points to the server, thereby decreasing time consumed in a process of recording a hazard point and increase the efficiency and the accuracy of recording the hazard point.

The above only describes preferred embodiments of the present disclosure. It should be noted that, for those skilled in the art, various improvements or modifications may be made without departing the principle of the present disclosure, such improvements or modifications are included within the protection scope of the present disclosure.

The invention claimed is:

1. A hazard point marking method, comprising:
acquiring, by Augmented Reality (AR) glasses, position information of a hazard point in response to a triggering operation of an inspector, wherein a process of the AR glasses acquiring the position information of the hazard point comprises: acquiring, by the AR glasses, information of a cable where a safety hazard exists from a real world; generating, by the AR glasses, a virtual mark characterizing a position of the cable where the safety hazard exists; and in integrating, by the AR glasses, the information of the cable in the real world with the virtual mark, to obtain the position information of the hazard point, wherein the position information of the hazard point is used for characterizing a position of the hazard point in a tunnel model, wherein the tunnel model is a model corresponding to a tunnel currently inspected by the inspector, which is a virtual representation form of a tunnel in the real world;
sending, by the AR glasses, the position information of the hazard point to a server; and marking, by the server, the hazard point in the tunnel model based on the position information of the hazard point.

2. The hazard point marking method according to claim 1, further comprising:
   acquiring, by the AR glasses, a photo of the hazard point;
   sending, by the AR glasses, the photo of the hazard point to the server; and
   establishing, by the server, a linking relation between the photo of the hazard point and the marked hazard point.

3. The hazard point marking method according to claim 2, further comprising:
   acquiring, by the AR glasses, a type of the hazard point;
   sending, by the AR glasses, the type of the hazard point to the server; and
   establishing, by the server, a linking relation between the type of the hazard point and the marked hazard point.

4. The hazard point marking method according to claim 3, further comprising:
   displaying, by the server, the position information, the photo and the type of the hazard point in response to a triggering operation of an operator on the hazard point.

5. The hazard point marking method according to claim 4, wherein the server marking the hazard point in the tunnel model based on the position information of the hazard point comprises:
   determining, by the server, a marking position of the hazard point in the tunnel model based on the position information of the hazard point; and
   generating and displaying, by the server, a virtual mark for the hazard point at the marking position.

6. The hazard point marking method according to claim 3, wherein the server marking the hazard point in the tunnel model based on the position information of the hazard point comprises:
   determining, by the server, a marking position of the hazard point in the tunnel model based on the position information of the hazard point; and
   generating and displaying, by the server, a virtual mark for the hazard point at the marking position.

7. The hazard point marking method according to claim 2, wherein the server marking the hazard point in the tunnel model based on the position information of the hazard point comprises:
   determining, by the server, a marking position of the hazard point in the tunnel model based on the position information of the hazard point; and
   generating and displaying, by the server, a virtual mark for the hazard point at the marking position.

8. The hazard point marking method according to claim 1, wherein the server marking the hazard point in the tunnel model based on the position information of the hazard point comprises:
   determining, by the server, a marking position of the hazard point in the tunnel model based on the position information of the hazard point; and
   generating and displaying, by the server, a virtual mark for the hazard point at the marking position.

9. A hazard point marking system, comprising:
   Augmented Reality (AR) glasses, configured to acquire position information of a hazard point and send the position information of the hazard point to a server in response to a triggering operation of an inspector, wherein the AR glasses being configured to acquire the position information of the hazard point comprises the AR glasses being configured to: acquire information of a cable where a safety hazard exists from a real world; generate a virtual mark characterizing a position of the cable where the safety hazard exists; and integrate the information of the cable in the real world with the virtual mark, to obtain the position information of the hazard point, wherein the position information of the hazard point is used for characterizing a position of the hazard point in a tunnel model, wherein the tunnel model is a model corresponding to a tunnel currently inspected by the inspector, which is a virtual representation form of a tunnel in the real world; and
   the server, configured to mark the hazard point in the tunnel model based on the position information of the hazard point.

10. The hazard point marking system according to claim 9, wherein
   the AR glasses is further configured to acquire a photo of the hazard point and send the photo of the hazard point to the server; and
   the server is further configured to establish a linking relation between the photo of the hazard point and the marked hazard point.

11. The hazard point marking system according to claim 10, wherein
   the AR glasses is further configured to acquire a type of the hazard point and send the type of the hazard point to the server; and
   the server is further configured to establish a linking relation between the type of the hazard point and the marked hazard point.

12. The hazard point marking system according to claim 11, wherein
   the server is further configured to display the position information, the photo and the type of the hazard point in response to a triggering operation of an operator on the hazard point.

13. The hazard point marking system according to claim 12, wherein the server is configured to:
   determine a marking position of the hazard point in the tunnel model based on the position information of the hazard point; and
   generate and display a virtual mark for the hazard point at the marking position.

14. The hazard point marking system according to claim 11, wherein the server is configured to:
   determine a marking position of the hazard point in the tunnel model based on the position information of the hazard point; and
   generate and display a virtual mark for the hazard point at the marking position.

15. The hazard point marking system according to claim 10, wherein the server is configured to:
   determine a marking position of the hazard point in the tunnel model based on the position information of the hazard point; and
   generate and display a virtual mark for the hazard point at the marking position.

16. The hazard point marking system according to claim 9, wherein the server is configured to:
   determine a marking position of the hazard point in the tunnel model based on the position information of the hazard point; and
   generate and display a virtual mark for the hazard point at the marking position.

* * * * *